United States Patent [19]

Morrison et al.

[11] Patent Number: 4,822,590
[45] Date of Patent: Apr. 18, 1989

[54] FORMS OF TRANSITION METAL DICHALCOGENIDES

[75] Inventors: S. Roy Morrison, Burnaby; Robert F. Frindt, Vancouver; Per Joensen, Coquitlam; Michael A. Gee, Vancouver; Bijan K. Miremadi, Coquitlam, all of Canada

[73] Assignee: Simon Fraser University, Burnaby, Canada

[21] Appl. No.: 855,517

[22] Filed: Apr. 23, 1986

[51] Int. Cl.[4] .................... C10B 17/20; C01G 35/00; C01G 39/06; C01G 41/00

[52] U.S. Cl. .................... 423/561.1; 423/53; 423/62; 106/DIG. 2; 252/378 R; 429/194; 429/196; 429/199; 429/218; 502/215; 502/219; 502/220

[58] Field of Search .................... 423/53, 62, 561 R; 106/DIG. 2; 252/378 R; 429/194, 196, 199, 218; 502/215, 219, 220

[56] References Cited

U.S. PATENT DOCUMENTS

| | | | |
|---|---|---|---|
| 3,763,043 | 10/1973 | Thompson | 423/561 R |
| 4,125,687 | 11/1978 | Di Salvo et al. | 429/194 |
| 4,198,476 | 4/1980 | Di Salvo et al. | 429/218 |
| 4,206,276 | 6/1980 | Basu et al. | 429/218 |
| 4,233,377 | 11/1980 | Haering et al. | 429/218 |
| 4,299,892 | 11/1981 | Dines et al. | 423/508 |
| 4,303,748 | 12/1981 | Armand et al. | 429/199 |
| 4,323,480 | 4/1982 | Dines et al. | 423/561 R |
| 4,574,113 | 3/1986 | Gray | 429/194 |

FOREIGN PATENT DOCUMENTS 58-135103  8/1983  Japan ................ 252/378 R

Primary Examiner—John Doll
Assistant Examiner—Robert M. kunemund
Attorney, Agent, or Firm—Klarquist, Sparkman, Campbell, Leigh & Whinston

[57] ABSTRACT

Novel single layer materials of the form $MX_2$, where $MX_2$ is a layer-type dichalcogenide such as $MoS_2$, $TaS_2$, $WS_2$, or the like, exfoliated by intercalation of an alkali metal, and immersion in water, are disclosed. $MoS_2$ has been exfoliated into monolayers by intercalation with lithium followed by reaction with water. X-ray diffraction analysis demonstrates that the exfoliated $MoS_2$ in suspension is in the form of one-molecule-thick sheets. X-ray patterns from dried and re-stacked films of exfoliated $MoS_2$ indicate that the layers are randomly stacked. By adsorbing monolayers or precipitating clusters of various species such as compounds of Co, Ni, Pb, Cd, Al, Ce, In and Zn, on $MoS_2$ while the sulfide is suspended as single layers and then recrystallizing, a new group of inclusion compounds can be formed. In the re-crystallized or re-stacked materials, the interlayer spacing can be expanded or contracted compared to $MoS_2$.

19 Claims, 3 Drawing Sheets

FORMS OF TRANSITION METAL DICHALCOGENIDES

FIELD OF THE INVENTION

This invention is directed to novel single-layer transition metal dichalcogenide layered compounds and a method for preparing same with or without incorporated foreign species.

BACKGROUND OF THE INVENTION

For some time there has been a widespread interest in two-dimensional systems, and in particular, transition metal dichalcogenide layered compounds. This group of materials is usually considered to be two-dimensional because of the high anisotropy resulting from strong bonding within the layers and weak interlayer interactions. Additional interest in layered compounds arises from the fact that they can be intercalated with a variety of metals and compounds.

Exfoliation of the metallic layered compounds $TaS_2$ and $NbS_2$ by intercalation of hydrogen and water has been previously reported. U.S. Pat. No. 4,299,892, issued to Martin B. Dines, et al., 1975, discloses amorphous and sheet dichalcogenides of Group IVB, VB, molybdenum and tungsten.

Present methods for preparing restricted types of inclusion compounds consist of the following techniques:
1. Simple intercalation, producing intercalation compounds;
2. Incorporation of certain organic materials during precipitation reactions synthesizing layered materials, as described in the Dines et al. patent, U.S. Pat. No. 4,299,892, column 12, lines 38-40; and
3. Crystal growth at high temperatures.

The applicants are aware of the following references which are more or less relevant to various aspects of this invention:
- F. Levy (editor, "Intercalated Layered Materials", Physics and Chemistry of Materials with Layered Structures, Vol. 6 (Reidel, Dordrecht, 1979);
- M. B. Dines, Mater. Res. Bull. 10, 287 (1975);
- Pourbaix, "Atlas of Electrochemical Equilibria in Aqueous Solutions" (Pergamon, 1966);
- D. W. Murphy and G. W. Hull, J. Chem. Phys. 62, 173 (1975).

SUMMARY OF THE INVENTION

We have discovered a novel method of preparing new single layer materials of the form $MX_2$, where $MX_2$ is a transition metal layer-type dichalcogenide such as $MoS_2$, $TaS_2$, $WS_2$, and the like.

The process involves intercalating the $MX_2$ with an alkali metal, for example, lithium in a dry environment for sufficient time to enable the lithium to substantially intercalate the $MX_2$. The lithium intercalated $MX_2$ is then immersed in water. The water reacts with the intercalated lithium and forms hydrogen gas between the layers of $MX_2$. The pressure of the evolved hydrogen gas causes the layers of $MX_2$ to exfoliate into single layers. This single layer $MX_2$ material may be useful as a coating and a lubricant.

In another aspect of the invention, we have prepared compounds of the form $MX_2$:Y, where $MX_2$ is a layer-type dichalcogenide such as $MoS_2$, $TaS_2$, $NbSe_2$, and the like, and Y is some foreign element or compound between the molecular layers of the dichalcogenide. These new materials are described as "inclusion solids". In the case of $MoS_2$, significant improvement in the characteristics of the $MoS_2$ used in catalysis, gas storage, lubrication, or batteries, can be expected upon adding certain Y "inclusions". The problem in the past has been to provide a method of depositing such additives Y to enhance the properties of the $MoS_2$ for each application.

Our process enables the formation of new types of materials which are prepared by separating (exfoliating) the layers of a layered dichalcogenide compound such as $MoS_2$ into single molecular layers, depositing species (Y inclusions) onto the surfaces of these single layers, and re-forming a solid with the deposited species trapped or included between the $MoS_2$ layers. Such novel materials can be called inclusion compounds or inclusion solids.

DRAWINGS

DETAILED DESCRIPTION OF SPECIFIC EMBODIMENTS OF THE INVENTION

Figure 1:
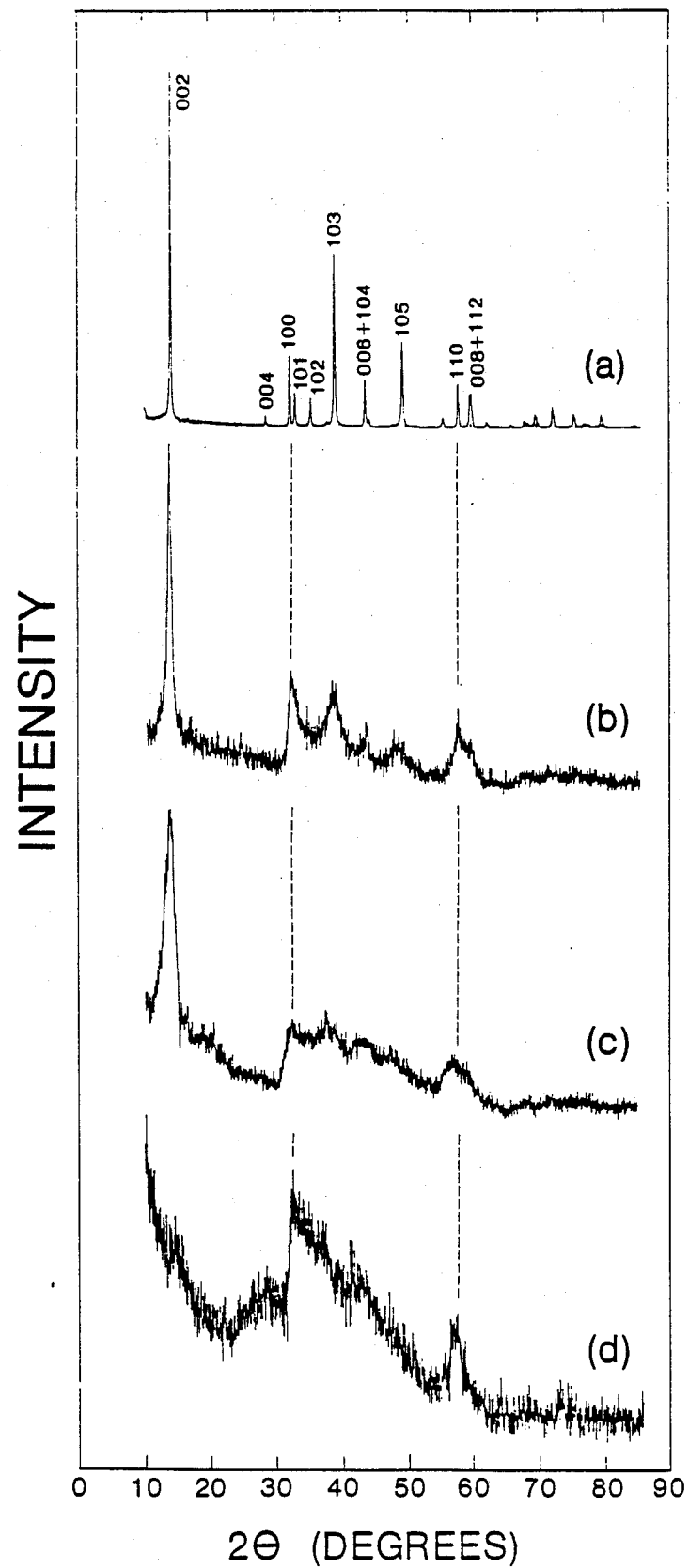
FIG. 1 illustrates X-ray diffraction patterns for (a) untreated $MoS_2$, (b) a dried film of partially exfoliated $MoS_2$, (c) a dried film of completely exfoliated $MoS_2$, and (d) completely exfoliated $MoS_2$ in suspension in water.

Incorporation of inclusions during sythesis by precipitation is limited to a few special cases. Intercalation is similarly restricted, in that only relatively few intercalants are known. In high-temperature crystal growth the final result is not easily controlled.

On the other hand, we believe that our technique is more easily controlled and can be used to prepare a much wider range of inclusion solids than would otherwise be possible. The species "included" is chosen in each case to improve the $MX_2$ in one of its applications. We prepare inclusion solids in the form $MX_2$:Y ($MX_2$ is the dichalcogenide, Y the included species) by utilizing the phenomenon of exfoliation of $MX_2$ layered compounds in liquids, as described previously, followed by or concurrent with precipitation of "inclusions", washing, and then drying.

Inclusion solids can be prepared by any of the following methods:
1. Exfoliation of the layered material $MX_2$ in a solution containing ions of Y which can be made to precipitate on monolayers (or multilayers) of the layered material. The most effective approach is to prepare the solution at a pH sufficiently low to keep Y in solution. When exfoliation using lithium occurs, the reaction:

$$2Li + 2H_2O \rightarrow H_2 + 2Li^+ + 2OH^-$$

occurs, and the OH⁻ generation drives the pH up locally, inducing precipitation of Y as a hydroxide close to the same site as the Li occupied on the dichalcogenide. The composition of the liquid is chosen such that the single layers of $MX_2$ will not rapidly flocculate after exfoliation, but remain in suspension as single layers. After drying such a suspension or changing the solution to induce flocculation, the resulting powder will have the species Y incorporated between its layers. In our process we have shown that by pH control, the species Y can be deposited as uniform layers of precipitate and/or clusters of the adsorbate sandwiched among layers of the exfoliated layered material.

2. Simultaneous exfoliation of two or more layered materials (e.g. $MX_2$ and $M'X'_2$) in a liquid, with subsequent drying. The included material is one of the layered materials such that upon restacking, the layers of $MX_2$ are located between the layers of $M'X'_2$. Such materials could be called random layered alloys.

3. Any combination of 1 and 2 above.

Our process conceivably has use in the preparation of catalysts, intercalation batteries, lubricants, and materials for gas storage.

In the case of catalysis, inclusion may be the ideal way to introduce promoters. Furthermore, we find the specific surface area can be greatly increased if the included material does not entirely fill the spaces between the layers, but is present in clusters, permitting gas adsorption on the remaining exposed surfaces.

In the case of intercalation batteries, more rapid discharge and recharge may be effected by "propping apart" the layers by insertion of suitable foreign species. In addition, one of the problems with intercalation batteries is the cyclic swelling of the layered electrode during intercalation. It is anticipated that with suitable inclusions, this swelling may be avoided. This improvement would be particularly important in batteries with solid electrolytes.

A new class of lubricants is also made possible by this process.

Inclusion compounds can also be used for the storage of gases such as hydrogen or methane, with two highly advantageous features, first, that the stored gas can go in and out of the solid very rapidly if the layers are separated by an appropriate included material, and second, that the included material may be chosen to form a complex with the gas to be stored (e.g. form a hydride if hydrogen is to be stored), thus enabling high concentrations of stored gas.

Experiments have been carried out with molybdenum disulfide, $MoS_2$, as a species of a single-layer transition metal dichalcogenide layered compound. We have successfully performed the exfoliation of the semiconducting layered compound $MoS_2$ using our novel technique. We believe this is the first report on exfoliation of any semiconducting layered compound. In addition to the possibility of having practical applications, such as in coatings, lubricants, catalysis, and the like, we believe that studies on single-layer $MoS_2$ and re-stacked $MoS_2$ can uniquely contribute to a general understanding of the layered compounds.

A single layer of $MoS_2$ consists of a sheet of molybdenum (Mo) atoms sandwiched between two sheets of sulfur (S) atoms. Such layers when stacked make up the $MoS_2$ crystals. In the most common naturally-occurring polytype of $MoS_2$ crystals, $2H$-$MoS_2$, there are two layers per unit cell.

$MoS_2$ is well known as an active hydrodesulfurization catalyst, and numerous methods for the preparation of unsupported and supported $MoS_2$ have been described in the literature. In contrast to these techniques, which entail the synthesis of $MoS_2$ from other molybdenum compounds, our method uses bulk $MoS_2$ as the starting material. The method consists of exfoliation of $MoS_2$ in aqueous suspension, with or without alumina present, followed by flocculation or centrifuging and/or drying to obtain supported or unsupported material.

We have prepared high surface area unsupported and supported $MoS_2$ by our novel techniques, and have prepared $MoS_2$ with various proportions of basal plane and edge plane areas. Our technique of exfoliation in aqueous suspension has also led to studies on the inclusion of foreign species between the layers of re-stacked $MoS_2$. We have conducted X-ray diffraction studies on single-layer $MoS_2$ prepared according to our process and have compared our data to theoretical predictions.

The starting material used in our experiments was $2H$-$MoS_2$ powder ($-325$ mesh) such as obtained from Materials Research Corporation. The technique that we have developed for the exfoliation of the $MoS_2$ is described in detail as follows. The $MoS_2$ was first soaked in a solution of n-butyl lithium in hexane (we have tested from 0.2M to 2.6M), usually for about 48 hours, in a dry box containing an argon atmosphere. This is known to produce $Li_xMoS_2$ to a mole fraction of at least $x=1$. Following the intercalation of the $MoS_2$ by lithium, the $MoS_2$ was removed, washed repeatedly in hexane, dried, and sealed in a vial, while still in the dry box under argon atmosphere. The vial was then removed from the dry box, immersed in water, and the cap removed from the vial. Upon contact of the contents of the vial with the water, copious gas evolution followed and the $MoS_2$ powder formed a highly opaque suspension in the water. The suspension was ultrasonicated or otherwise agitated during the reaction to assist in the exfoliation.

Although we do not wish to be bound by any theories, we have hypothesized for the sake of illustrating the mechanism of the invention that the reaction between the water and the intercalated lithium forms hydrogen gas between the layers, and the expansion of this gas tends to separate the $MoS_2$ layers. As the reaction proceeds more deeply into each crystallite, the $MoS_2$ layers become further separated. Eventually the $MoS_2$ layers become completely separated and remain suspended in the aqueous solution. The pH of the solution was moderately basic at this stage due to the presence of lithium hydroxide, although the final pH depends, of course, on the initial pH.

Although the results reported below refer to samples exfoliated in water, we have also exfoliated lithium-intercalated $MoS_2$ in methanol, ethanol, and isopropanol.

The unexfoliated $MoS_2$ as received from Materials Research Corporation, when suspended in water, settled out in times of the order of 10 minutes. In comparison, we found that $MoS_2$ exfoliated in water (at neutral to basic pH) remained in suspension for several days or weeks. However, flocculation occurred rapidly (within one hour) when the pH was reduced to a value of 2 or less. With the addition of a surfactant or with dilute suspensions, we found that the particles remained in suspension for at least several months, requiring ultracentrifugation to clear the suspension.

Using no surfactant, it was found by experimentation that if exfoliation took place in the presence of a sufficient quantity of alumina powder ($Al_2O_3$), or if alumina powder was introduced following the exfoliation, the suspension would clear in a few minutes, implying deposition of the flakes of $MoS_2$ onto the alumina under conditions when it would not adhere to itself (flocculate). The deposition on alumina provided a method of removing the exfoliated $MoS_2$ from suspension without re-stacking by flocculation. Such "supported" samples were washed to remove lithium hydroxide and then dried. The amount of alumina (1 micron diameter powder) necessary to clear a suspension of exfoliated $MoS_2$ was such that the total area of the alumina was approximately matched to half the total area of the $MoS_2$ (as calculated knowing the mass of $MoS_2$ and assuming single-layer dispersion). The suspension did not clear if insufficient alumina was present, indicating that the alumina particles became covered with monolayers of $MoS_2$ and additional $MoS_2$ particles remained in suspension without adhering to the $MoS_2$-coated alumina, or to other $MoS_2$ particles. Deposition of multilayers, if desired, was achieved at this point in the process by lowering the pH to cause flocculation. Numerous samples of alumina-supported $MoS_2$ were prepared. Varying amounts of coverage were achieved using $MoS_2$ monolayers and multilayers. Typical proportions of $MoS_2$ to alumina were in the range 0.5% to 10% $MoS_2$ by mass.

Chemical analysis of dried exfoliated $MoS_2$ was carried out using a Perkin-Elmer model 595 scanning Auger microprobe (SAM) and a model ISI-DS 130 scanning electron microscope (SEM) equipped with an energy-dispersive X-ray spectrometer. Both forms of analysis showed that the ratio of Mo to S was unchanged (within approximately 5%) by exfoliation, indicating that the $MoS_2$ had not reacted to form other compounds. No new elements (e.g. lithium or oxygen) were detected after exfoliation. From the SAM results, oxygen, if present, comprised less than 0.5% of the surface regions of the samples analyzed. In contrast, analysis of $MoS_2$ exfoliated and re-stacked in the presence of suitable foreign species in solution showed that foreign material can be included within the layers.

X-ray diffraction patterns were obtained with a Philips diffractometer using nickel-filtered Cu K-alpha radiation. The diffraction patterns for untreated $2H-MoS_2$ (the starting material), for exfoliated $MoS_2$ in suspension, and for dried and re-stacked $MoS_2$ films are shown in FIG. 1. In FIG. 1(d), which illustrates the pattern for exfoliated $MoS_2$ in suspension, the absence of the (002), (103), and (105) lines is strong evidence for monolayers. The suspension was a concentrated slurry obtained by centrifuging a more dilute suspension. In FIG. 1(c), which illustrates the pattern for a dried and re-stacked powder, the width of the (002) line indicates from the Scherrer formula that the average correlation distance along the c-axis is approximately 8 layers. Random stacking is indicated by the asymmetric broadening of the (100) line as well as by the near-absence of the (103) and (105) lines, and is consistent with calculations for interlayer rotation about the c-axis. FIG. 1(b) is for a sample which was not ultrasonicated during exfoliation. In this case, the remaining presence of the (103) and (105) lines indicates that the layers had not completely separated, so that the resulting powder consisted of microcrystallites of $MoS_2$ with thicknesses of at least several layers.

Figure 2:
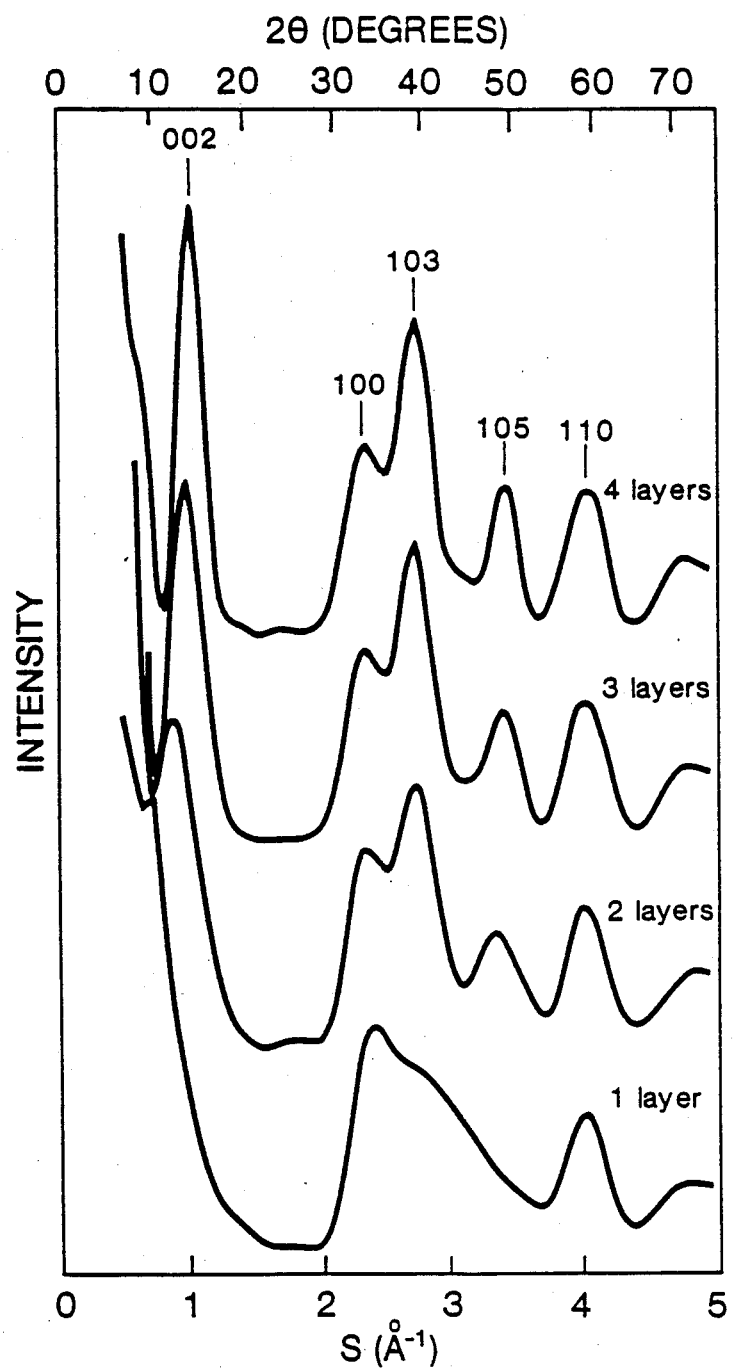
FIG. 2 illustrates calculated X-ray diffraction patterns for microcrystallites of $2H$-$MoS_2$.

Comparison of the data in FIG. 1 with diffraction patterns calculated for crystallites of $MoS_2$ having thicknesses of 1, 2, 3, and 4 molecular layers, as shown in FIG. 2, provides further demonstrative proof for the small particle thickness achieved. In particular, the striking agreement between FIG. 1(d) and the calculated curve for one $MoS_2$ layer provides convincing evidence that FIG. 1(d) is a single-layer diffraction pattern and that totally exfoliated $MoS_2$ has been achieved. We have carried out single-layer calculations and have determined that the shoulder of the (100) line at an angle $2\theta$ of about 40 degrees is due to sulfur scattering. Our experimental results are consistent with the bulk S-S distance (sandwich height) of 3.17 Angstroms used for FIG. 2.

We have also conducted experiments on adsorbing monolayers or precipitating clusters of various species on exfoliated $MoS_2$ while the $MoS_2$ is suspended as single layers, and re-crystallizing the product to form a new group of compounds which we have described as "inclusion" compounds.

Inclusion provides a much broader class of materials than can be obtained by simple intercalation of species into a layered compound. Specifically with $MoS_2$, alkali metal atoms in general can be intercalated but lithium can most easily be intercalated. But by our inclusion techniques, it is possible to introduce many different species between the layers. Such versatility is highly desirable, namely, for catalysis to introduce promoters; for the adsorption of gases to introduce a species that interacts strongly with the gases; for intercalation batteries to introduce a species which expands and stabilizes the host structure; and for lubrication applications.

The approach we have used for making inclusion compounds makes use of the conditions obtained during exfoliation. As described above, the exfoliation is associated with the reaction of lithium with water to produce hydrogen. At the same time, of couse, lithium hydroxide is also produced and the pH increases significantly. Thus, to prepare inclusion compounds, we have used materials that precipitate as the hydroxide. We introduce the materials at a sufficiently low pH that they are soluble. During the exfoliation reaction the pH increases and the hydroxides of the metal ions precipitate onto the surfaces of the $MoS_2$. In many cases, it can be concluded that we can limit the precipitation to essentially one monolayer or less.

Other techniques of inducing adsorption of species from solution onto the single layer $MoS_2$ (such as using a saturated solution of the species) will be apparent to those skilled in the art.

Methods

To produce inclusion solids, exfoliation was carried out in aqueous metal nitrate solutions according to the procedures described above. The metal nitrate salts employed were all reagent grade, the choice of metal being based on their potential interest (for example, nickel (Ni) and cobalt (Co) were used because they are catalytic promoters) and on the insolubility of the metal hydroxide. The amount of precipitate can be controlled by using specified amounts of metal nitrbate or by pH adjustment.

In our initial experiments, the pH of the metal nitrate solutions was raised until the solutions were slightly cloudy (some precipitation) but it was found that to obtain a uniform re-stacked layer spacing for most cases (as determined by X-ray diffraction), the pH had to be lowered. We have determined that the pH of the exfoliated solutions should be of a magnitude such that the hydroxide forms essentially monolayer coverage on the $MoS_2$. The preferred pH was found to be of a lower value than the pH corresponding to the solubility minimum of the metal hydroxide selected. The pH of the metal nitrate solutions was adjusted using nitric acid ($HNO_3$) and potassium hydroxide (KOH).

We found that for complete exfoliation of the $MoS_2$, vigorous shaking and ultrasonication or high speed stirring for about half an hour was required. To re-stack the sample, the exfoliated suspension was centrifuged and dried at approximately 60° C. This was followed by a 0.5M $HNO_3$ acid wash to remove any surface hydroxides (precipitates which are not trapped between the layers). The samples were then centrifuged, washed in distilled $H_2O$, re-centrifuged and dried at 60° C. in preparation for study.

A scanning electron microprobe with energy-dispersive X-ray analysis (SEM-EDX) was used to determine the amount of metal present relative to Mo. Auger analysis was used to monitor oxygen and lighter elements using a Perkin-Elmer model 595 scanning Auger microprobe. X-ray diffration measurements were made with N1-filtered Cu K-alpha radiation using a Philips diffractometer and B.E.T. surface area measurements were made with a non-commercial apparatus.

Figure 4:
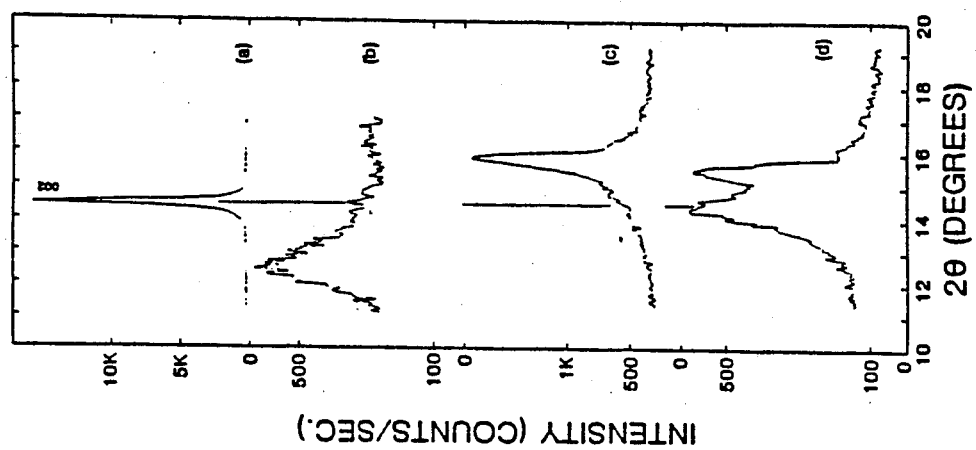
FIG. 4 illustrates the same respective X-ray diffraction patterns as in FIG. 1 but with an expanded scale around the (002) or (001) peak.
Figure 3:
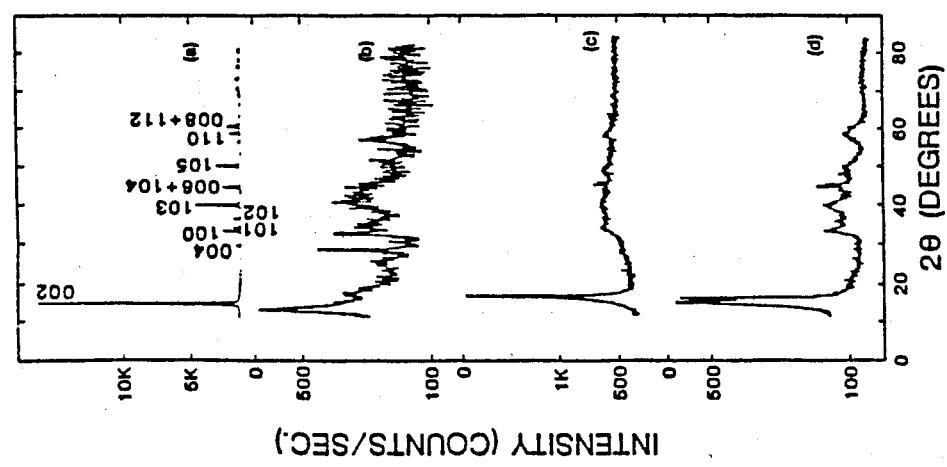
FIG. 3 illustrates X-ray diffraction patterns for (a) untreated $MoS_2$, (b) $MoS_2$ exfoliated in 0.2M $Pb(NO_3)_2$, (c) $MoS_2$ exfoliated in 1.0M $Co(NO_3)_2$ and (d) $MoS_2$ exfoliated in 0.16M $Ni(NO_3)_2$.

FIGS. 3 and 4 illustrate typical X-ray patterns for several inclusion compounds that have been made. As seen most clearly in FIG. 4, the shift of the (001) peak relative to the (002) peak for $MoS_2$ (with two layers per unit cell) indicates the presence of Pb and Co respectively (presumably as a hydroxide; between every $MoS_2$ layer, giving rise to an increase in layer separation of 17% for the lead (Pb) inclusion and a layer contraction of 7.3% for Co. Furthermore, the sharpness of the peak in FIG. 4(c) strongly suggests a highly uniform monolayer inclusion of Co. If the exfoliation is incomplete, i.e. not totally into single layers, two peaks are observed, one due to the original pure $MoS_2$ spacing, the other representing a layer change due to the presence of precipitate. An example of such a mixed situation is shown for Ni in FIGS. 3(d) and 4(d). An estimated particle size of about four layers thick can be made for the $MoS_2$, based on FIG. 4(d), and on X-ray line broadening with samples prepared identically but with no inclusion.

Other features in FIG. 3 can be observed. First, it should be noted that a typical X-ray diffraction pattern for re-stacked totally exfoliated $MoS_2$ without inclusions has a strong peak located at the same position as the (002) peak for bulk $MoS_2$. The (100) peak has a sharp leading edge followed by a broad downward sloping tail on the high angle side and the (110 peak is a more symmetrical broad peak. Though the change in layer separation causes the (001) peak to shift in FIGS. 3(b), 3(c) and partially in FIG. 3(d), the (100) and (110) peak positions remain essentially unchanged in the presence of an inclusion. In some cases, the (100) and (110) peaks shifted down in angle by amounts corresponding to an increase in a-spacing of approximately 5%. In FIGS. 3(b) and 1(c), the presence of the (103) and (105) lines associated with two layers per unit cell $MoS_2$ can be seen, suggesting that there is some degree of ordered re-stacking of the layers. The sharp peaks at angles greater than 20° in FIG. 3(b) are most likely due to the inclusion. The two sharp lines at approximately 44°, present in both FIGS. 3(c) and 1(d), are due to the Al sample holder and Si (accidentally introduced during exfoliation).

Figure 5:
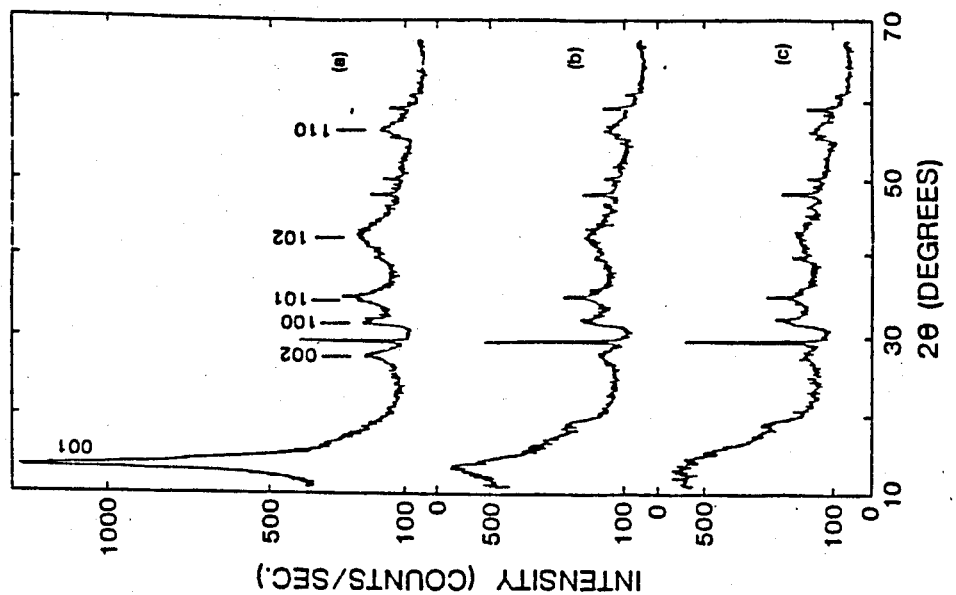
FIG. 5 illustrates X-ray diffraction patterns for $MoS_2$ exfoliated in 0.2M $Cd(NO_3)_2$ where the pH of the exfoliated suspension has been changed: (a) final pH=6.3, (b) final pH=7.4 and (c) final pH=11.3.

FIG. 5 shows X-ray diffraction patterns of cadmium (Cd) inclusion compounds (which have an increased layer separation) where the pH was adjusted after exfoliation to three different values. From the sharpness and shift of the (001) peak in FIG. 5(a), we conclude that the layers are uniformly expanded when the final pH is kept very slightly acidic (pH=6.3). When the final pH is approximately 10-13, where $Cd(OH)_2$ is stable, the (001) peak weakens. This suggests, as could be expected, that at a slightly acidic pH, the $Cd(OH)_2$ adsorbs as a monolayer but as the pH increases the $Cd(OH)_2$ precipitates as small clusters on the $MoS_2$ surfaces. These small clusters lead to a more variable or random layer spacing upon re-stacking, giving rise to the broadening of the (001) line seen in FIG. 5. The broadening of the (002) line in FIG. 5 supports this interpretation. The relatively broad peaks identified in FIG. 5(a) correspond to a re-stacked system with one layer per unit cell rather than the two layers per unit cell of bulk $MoS_2$. In FIG. 5(a), the indicated positions of the (002), (101) and (102) lines were calculated from the positions of the (001), (100) and (110) peaks. The prominent sharp peak located at $2\theta=29.33°$ in FIG. 5 corresponds to (100) reflection from $Cd(OH)_2$. All the other sharp lines in FIG. 5 have been identified as being due to $Cd(OH)_2$, CdO or Cd with agreement to within a few tenths of a degree.

Table 1 lists the materials which we have studied to date with their associated BET, SEM-EDX and X-ray diffraction results. Some samples were analyzed using an Auger microprobe. The Auger electron spectra showed the presence of the included metal as well as oxygen, in proportions consistent with hydroxides of the included metal. Also included in Table 1 are the pH values of the metal nitrate solutions before exfoliation and the pH values of the exfoliated suspensions. It is observed that inclusion of Ni, Co or Zn causes a lattice contraction whereas Cd or Pb, which are larger ions, cause a lattice expansion. The large increase in host layer separation for Pb and Cd is not accompanied by an increase in B.E.T. surface area, indicating that the expansion was insufficient to permit nitrogen adsorption between the layers during the B.E.T. runs. Aluminum (Al), cesium (Ce), indium (In) and zirconium (Zr) produce compounds with increased B.E.T. areas when compared to untreated $MoS_2$ and assuming we were able to remove all the exposed precipitate with the acid wash, these species, presumably in their hydroxide form, should also be trapped between the layers. The fact that an increased surface area is seen without a host layer separation suggests that the included species is in clusters that were not removed by or were inaccessible to the acid wash. The last entries of Table 1 show the results of attempts to simultaneously introduce two materials, one of which when included individually expands the lattice, the other producing an increased B.E.T. area. In addition to the materials listed in Table 1, we have successfully included Pd and Sr.

In the studies described in Table 1, the pH of the exfoliated suspension was allowed to reach its own level. Another approach which we have tested with Cd and Pb inclusions is to exert more control over the pH by adjusting it either before and/or after exfoliation.

The data illustrated in the Figures and Table 1 confirm that a variety of inclusion solids can be formed by deposition or precipitation onto single layer $MoS_2$ in suspension and subsequent drying of the suspension. The results show that the included species can be in monolayer or sub-monolayer form or as clusters. We have demonstrated that the form of the inclusion can be controlled by changing the pH of the suspension.

Inclusion solids are a new family of materials which have not and likely cannot be made by other means. We believe that a very broad selection of included materials can be made in forms from sub-monolayer to clusters of varying sizes using a variety of host layered compounds. The included species can be designed for specific possible applications. For example, Co and Ni are highly active promoters in hydrodesulfurization with $MoS_2$ as the catalyst.

In our process, the included species is deposited as a hydroxide. In many cases, it is possible to convert the hydroxide to the metal simply by heating, and other forms of precipitate are also possible by a suitable choice of suspension conditions.

Many applications can be visualized in addition to catalysts, for example, in gas storage, where inclusions expand the layers and adsorb gases or permit gas phase access to the host layers. For intercalation battery applications, includions can separate and stabilize the host electrode layers.

wherein $MX_2$ is a layer type transition metal dichalcogenide selected from the group consisting of $MoS_2$, $TaS_2$, $WS_2$, which comprises:
(a) intercalating multi-layer $MX_2$ with an alkali metal in a dry environment for sufficient time to enable the alkali metal to substantially intercalate the layers of the $MX_2$; and
(b) immersing the alkali metal intercalated $MX_2$ in a liquid that generates a gas upon reaction with the alkali metal to thereby with suitable agitation cause the layers of $MX_2$ to separate.

2. A process as defined in claim 1 wherein the $MX_2$ is $MoS_2$.

3. A process as defined in claim 1 or 2 wherein the alkali metal is lithium.

4. A process of preparing a simple substance of the form $$MX_2:Y$$

wherein $MX_2$ is a layered transition metal dichalcogenide selected from the group consisting of $MoS_2$, $TaS_2$, $WS_2$, and Y is a foreign substance or substances which can be associated with the $MX_2$, which comprises:
(a) intercalating multi-layer $MX_2$ with an alkali metal in a dry environment for sufficient time to enable the alkali metal to substantially intercalate the layers of the $MX_2$;

TABLE 1

Properties of Inclusion Compounds formed by Exfoliation in an Aqueous Solution of Various Metal Nitrates

| METAL NITRATE PRESENT DURING EXFOLIATION | FINAL SURFACE AREA ($m^2$/g. of sample) | ATOMIC COMP/RATIO* $\frac{N\ metal}{N\ metal\ +\ N\ Mo}$ | LAYER SEPARATION (Å) | % LAYER EXPANSION(+) CONTRACTION(−) | pH OF SOLUTION BEFORE EXFOLIATION | pH OF SOLUTION AFTER EXFOLIATION |
|---|---|---|---|---|---|---|
| Untreated $MoS_2$ | 6.6 ± .3 | | 6.15 | | | |
| Exfoliated and re-stacked $MoS_2$ | 8.4 | | 6.15 (unchanged) | | | |
| 0.1 M $Al(NO_3)_3$ | 8.2 ± .3 | 0.082 | 6.15 ± .05 (unchanged) | | 3.1 ± 0.1 | ~3.8 ± 0.1 |
| 0.1 M $Al(NO_3)_3$ | 44.7 | 0.43 | Unchanged | | 8.1 | 6.7 |
| 0.2 M $In(NO_3)_3$ | 24.7 | 0.14 | Unchanged | | 3.0 | 8.7 |
| 1 M $Ni(NO_3)_2$ | 3.5 | 0.27 | 5.70 ± 0.05 | −7.3 ± 0.8 | 6.2 | ~6 → 7 |
| 1 M $Co(NO_3)_2$ | 5.1 | 0.29 | 5.70 ± 0.05 | −7.3 ± 0.8 | 6.8 | ~5.8 |
| 0.2 M $Ce(NO_3)_2$ | 14.3 | 0.061 | Unchanged | | 5.9 | 7.4 |
| 0.2 M $Sr(NO_3)_2$ | 4.3 | 0.13 | Unchanged | | 11.5 | 11.4 |
| 0.2 M $Cd(NO_3)_2$ | 5.7 | 0.11 | 6.66 | +8.4 ± 0.8 | 7.1 | 7.5 |
| 0.2 M $Zr(NO_3)_4$ | 52.9 | 0.50 | Unchanged | | 3.4 | ~10.5 |
| 0.2 M $Zn(NO_3)_2$ | 5.6 | 0.28 | 5.55, 5.66 | −9.7, −7.9 | 6.1 | 6.4 |
| 0.2 M $Pb(NO_3)_2$ | 6.5 | 0.23 | 7.19 | +17 ± 2 | 5.1 | 7.4 |
| 0.2 M ($Cd(NO_3)_2$ + $Zr(NO_3)_4$) | 3.9 | ~0, 0.45 Cd Zr | 6.50 | +5.8 ± 0.8 | 1.8 | 5.5 |
| 0.2 M ($Pb(NO_3)_2$ + $Zr(NO_3)_4$) | 3.1 | 0.14, 0.48 Pb Zr | 7.25 | +17.9 ± 0.8 | 2.7 | 4.0 |
| 0.2 M ($Cd(NO_3)_2$ + $Pb(NO_3)_2$) | 3.7 | ~0, 0.10 Cd Pb | 6.99 | +13.7 ± 0.8 | 5.0 | 6.5 |

Samples with included Al were washed in 0.1 M $HNO_3$, other samples in 0.5 M $HNO_3$ followed by an aqueous rinse.
*Probable error estimated at 10% of indicated value.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. An exfoliation process for preparing a single layer substance of the form $$MX_2$$

(b) immersing the alkali metal intercalated $MX_2$ in water or other suitable liquid to thereby with suitable agitation cause the layers of $MX_2$ to separate;
(c) precipitating or adsorbing ions of a Y substance on the surfaces of the $MX_2$; and
(d) washing, if appropriate, and drying the resulting $MX_2:Y$ product.

5. A process of preparing a substance of the form $$MX_2:Y$$

wherein $MX_2$ is a layered transition metal dichalcogenide selected from the group consisting of $MoS_2$, $TaS_2$, WS$_2$ and Y is a foreign substance or substances which can be associated with the MX$_2$, which comprises:

(a) intercalating multi-layer MX$_2$ with an alkali metal in a dry environment for sufficient time to enable the alkali metal to substantially intercalate the layers of the MX$_2$;

(b) immersing the alkali intercalated MX$_2$ in water or other suitable liquid which contains ions of Y to thereby with suitable agitation cause the layers of MX$_2$ to separate and the Y ions to adsorb or precipitate on the surfaces of the separated layers of MX$_2$; and (c) washing, if appropriate, and drying the resulting MX$_2$:Y product.

6. A process as defined in claim 5 wherein the pH of the water is maintained at a sufficiently low level to cause the Y ions to remain in solution.

7. A process as defined in claim 4 wherein the alkali metal is lithium.

8. A process as defined in claim 5 wherein the alkali metal is lithium.

9. A process as defined in claim 4 wherein the MX$_2$ is MoS$_2$.

10. A process as defined in claim 5 wherein the MX$_2$ is MoS$_2$.

11. A process as defined in claim 4 wherein two or more different species of MX$_2$ are present in the process.

12. A process as defined in claim 5 wherein two or more different species of MX$_2$ are present in the process.

13. A process as defined in claim 4 wherein the Y substance is selected from the group consisting of compounds of Co, Ni, Pb, Cd, Al, Ce, In, Pd, Sr and Zr.

14. A process as defined in claim 5 wherein the Y substance is selected from the group consisting of compounds of Co, Ni, Pb, Cd, Al, Ce, In, Pd, Sr and Zr.

15. A process as defined in claim 4 wherein the Y substance is precipitated on the surfaces of the separated layers of MX$_2$ in a single molecular layer or in clusters.

16. A process as defined in claim 5 wherein the Y substance is precipitated on the surfaces of the separated layers of MX$_2$ in a single molecular layer or in clusters.

17. A process as defined in claim 11 wherein upon ultimate drying, the different species of MX$_2$ restack so that layers of one species are located between layers of the other species.

18. A process as defined in claim 4 followed by changing the chemical form of Y by dehydration or reduction.

19. A process as defined in claim 1 wherein the alkali metal is lithium and the liquid is water.

* * * * *

UNITED STATES PATENT AND TRADEMARK OFFICE
CERTIFICATE OF CORRECTION

PATENT NO. : 4,822,590

DATED : April 18, 1989

INVENTOR(S) : MORRISON et al.

It is certified that error appears in the above-identified patent and that said Letters Patent is hereby corrected as shown below:

```
In the "Inventors" listing on the cover page, delete
";Bijan K. Miremadi, Coquitlam".
```

Signed and Sealed this

Twenty-sixth Day of February, 1991

Attest:

HARRY F. MANBECK, JR.

*Attesting Officer*     *Commissioner of Patents and Trademarks*